Dec. 21, 1965     J. I. SMUCK     3,224,611
TIRE-BUOY
Filed May 27, 1964

*INVENTOR.*
JOSEPH I. SMUCK
BY

United States Patent Office 3,224,611
Patented Dec. 21, 1965

3,224,611
TIRE-BUOY
Joseph I. Smuck, 4 Montrose Ave., Catonsville, Md.
Filed May 27, 1964, Ser. No. 370,450
5 Claims. (Cl. 214—334)

This invention relates generally to dollies and more particularly to a tire dolly for receiving a vehicle wheel which has been disabled and is incapable of supporting a vehicle load adequately.

Vehicle wheel dollies are old in the art per se, however, such prior structures have inherent disadvantages due to their present configurations. For instance, the surface engaging means on such prior structures is located at a point remote from the initial point of contact of the vehicle wheel with the dolly. Therefore, as the vehicle wheel approaches the dolly and attempts to roll thereon, the device is pushed forwardly. Such reaction of course, results in difficulty while attempting to place or roll the vehicle wheel onto the dolly.

Another difficulty presented by the prior known dolly structures was that of having only three point support structure. The three point configuration consisting usually of two back wheels and one front wheel is inadequate for supporting the vehicle wheel, since, during the turning operation, it would tip and engage one side thereof with the road surface, causing difficulties in operation of the vehicle.

Another important feature not found in the prior structures is that of locking the vehicle wheel on the dolly and retaining it from movement in all directions after being received thereon. Such prior structures, therefore, would not allow the vehicle to be driven in a backwardly direction, since the wheel would tend to remove itself, from or roll off the dolly. This difficulty is particularly present when and if an object, such as a rock is disposed in the path of one of the dolly wheels.

It is therefore, a primary object of this invention to provide a vehicle dolly which will eliminate all of the deficiencies present in prior known structures.

It is another object of the present invention to provide a vehicle wheel dolly which will not slide or slip away from a vehicle when it is attempted to roll the wheel thereon.

Still another object of this invention is to provide a vehicle wheel dolly which will not be likely to overturn or tip, thereby eliminating any engagment with the road surface.

Yet another object of the instant invention is to provide a vehicle wheel dolly which locks the vehicle wheel in place thereon and restricts movement thereof in either forward or backward movement.

These and other objects of the present invention will be more fully realized and understood from the following detailed description when taken in conjunction with the accompanying drawing wherein.

Like reference numerals throughout the various views of the drawing are intended to designate the same or similar structures.

Figure 1:
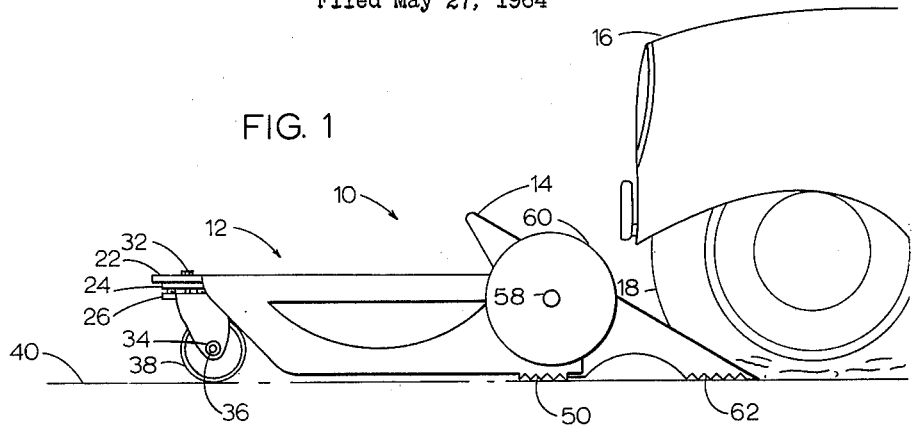
FIGURE 1 is a side elevational view of the present invention illustrating the carriage in wheel receiving position and showing portion of a vehicle and wheel being rolled thereon.

With reference to the drawing and in particular to FIGURE 1, there is shown the preferred form of the present invention. The dolly, being generally designated with the reference numeral 10, includes a platform 12 and a carriage 14. A vehicle 16, including a wheel 18 which has been disabled due to loss of air therein, is in position to be rolled onto the dolly. Platform 12 includes a pair of upstanding sides 20 depending from a horizontal front member 22.

A bearing plate 24 is secured to the horizontal front member and includes a pair of races therein. A second bearing plate 26 also includes a pair of races 28 therein for receiving ball bearing 30. A bolt 32 extends through holes in member 22, plate 24, and a plate 26. The bearings are disposed in the races of plates 24 and 26 for pivotal support therebetween. A pair of axle supporting members 33 extend from bearing plate 26 at the ends thereof and include bushing 34 therein for receiving an axle 36.

A pair of guide wheels 38 are pivotally mounted on axle 36 and are disposed with respect to the pivotal mounting of the bearing plates to maintain a tracking course when the dolly is moving on a surface 40.

Secured between each upstanding side member is a rod or wheel support member 42. A mounting support rod 44 also extends between the side members for pivotal support of the carriage. Each side member includes an arcuate slot 46 therein and a pin 48 extending therefrom for supporting one end of the carriage. A friction engaging edge 50 includes a plurality of teeth and is disposed at the rearward end of each side member.

Carriage 14 includes wheel support rods 52, 54, and 56. Rods 52 and 54 support the vehicle wheel when it is being rolled onto the dolly, and rod 56 supports the wheel in its final position thereon. An axle 58 is secured between the sides of the carriage and each end thereof extends through a respective slot 46. A pair of support wheels 60 are each mounted on the ends of axle 58. Because of the mounting of axle 58 and the pivotal mounting of the carriage, slot 46 necessarily must have a radius about the rod 44. The carriage also includes a pair of friction engaging edges 62.

Figure 2:
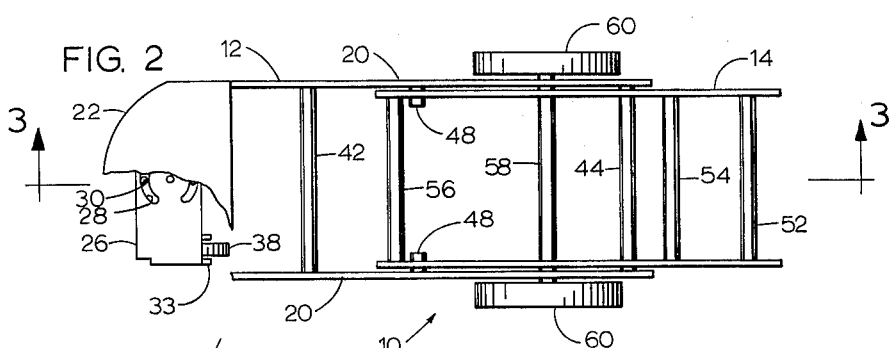
FIGURE 2 is enlarged top view of the invention shown partially broken to illustrate the pivotal mounting of the guide wheels.
Figure 3:
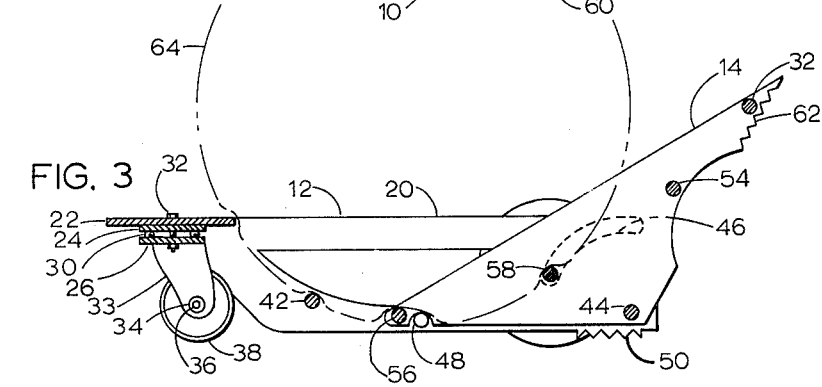
FIGURE 3 is a sectional view taken along lines 3—3 of FIGURE 2.
Figure 4:
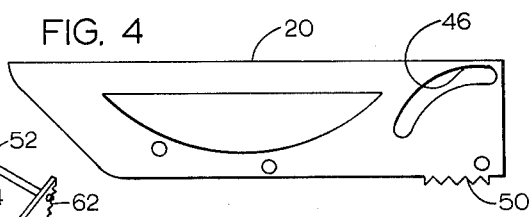
FIGURE 4 is a detail view of one side member and illustrating the means for locking the vehicle wheel in its intended position of the dolly.
Figure 5:
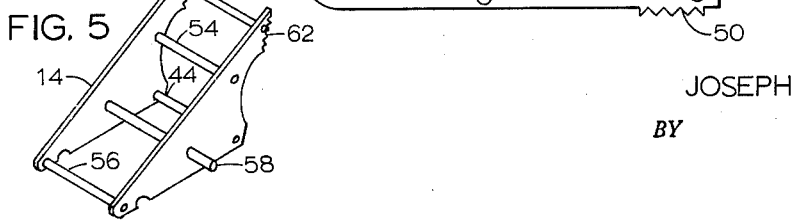
FIGURE 5 is a perspective view of the carriage of the present invention.

Because of the pivotal mounting of the carriage and the mounting of wheels 60 thereon, the support wheels will be raised from surface 40 when the carriage is pivoted to the position illustrated in FIGURE 1. When the vehicle wheel is rolled onto the carriage, the carriage will pivot to the position illustrated in FIGURES 2 and 3. In this position the vehicle wheel is locked onto the dolly from any forward and backward movement. This locking action results from the vehicle wheel bearing against the rod 56 and axle 58 as illustrated by the phantom line outline 64 of the vehicle wheel in FIGURE 3. It can be seen from FIGURE 3 that the vehicle wheel is locked into position on the dolly after it is received thereon and will not roll therefrom until the vehicle is raised.

The principles of the invention explained in connection with the specific exemplification thereon will suggest many other applications and modifications of the same. It is accordingly desired that, in construing the breadth of the appended claims they shall not be limited to the specific details shown and described in connection with the exemplification thereof.

What is claimed is:

1. A dolly for a vehicle wheel comprising a platform having a pair of upstanding sides each including a slot therein, a carriage pivotally mounted between said sides, an axle secured to said carriage and having each end thereof extending through a respective slot, a pair of support wheels each pivotally mounted or respective ends of said axle, and a guide wheel pivotally mounted on said platform.

2. A dolly for a vehicle wheel comprising a platform having a pair of upstanding sides, a carriage pivotally mounted between said sides, each of said sides including an arcuate slot having a radius about the pivotal mounting of said carriage, an axle secured to said carriage and having each end thereof extending through a respective slot, a pair of supporting wheels each pivotally mounted on a respective end of said axle, and a guide wheel pivotally mounted on said platform.

3. A dolly for supporting a vehicle wheel on a surface comprising a platform having a pair of upstanding sides, a carriage pivotally mounted between said sides at one end of said platform, each of said sides including an arcuate slot having a radius from the pivotal mounting of said carriage, an axle secured to said carriage and having each end thereof extending through a respective slot, a pair of supporting wheels each pivotally mounted on a respective end of said axle, and a guide wheel pivotally mounted on the other end of said platform, said carriage disposed for pivotal movement to one position for receiving the vehicle wheel thereon and to a second position for retaining the vehicle wheel, said supporting wheels disposed in spaced relationship to the surface in the one position and in engagement with the surface in the second position of said carriage.

4. A dolly for receiving and supporting a vehicle wheel on a surface comprising a platform having a pair of upstanding sides, means disposed for frictionally engaging the surface at one end of said platform, a carriage pivotally mounted between said sides at the one end of said platform, each of said sides including an arcuate slot having a radius from the pivotal mounting of said carriage, an axle secured to said carriage and having each end thereof extending through a respective slot, a pair of supporting wheels each pivotally mounted on a respective end of said axle, and a guide wheel pivotally mounted on the other end of said platform, said carriage disposed for pivotal movement to one position for receiving the vehicle wheel thereon and to a second position for retaining the vehicle wheel, said supporting wheels disposed in spaced relationship to the surface in the one position and in engagement with the surface in the second position of said carriage.

5. A dolly for a vehicle wheel comprising a platform having a pair of upstanding sides each including a slot therein, a carriage pivotally mounted between said sides, an axle secured to said carriage and having each end thereof extending through a respective slot, a pair of support wheels each pivotally mounted on respective ends of said axle, and a pair of guide wheels pivotally mounted on said platform.

References Cited by the Examiner
UNITED STATES PATENTS

| | | | |
|---|---|---|---|
| 2,573,728 | 11/1951 | Pugh | 214—334 |
| 2,608,312 | 8/1952 | Day | 214—334 |

HUGO O. SCHULZ, *Primary Examiner.*